Jan. 16, 1951          C. F. WALLACE              2,538,740
                         GALVANOMETER
Filed Sept. 11, 1946                          2 Sheets-Sheet 1

INVENTOR.
CHARLES F. WALLACE
BY
Ernest O. Given
ATTORNEY

Jan. 16, 1951 C. F. WALLACE 2,538,740
GALVANOMETER
Filed Sept. 11, 1946 2 Sheets-Sheet 2
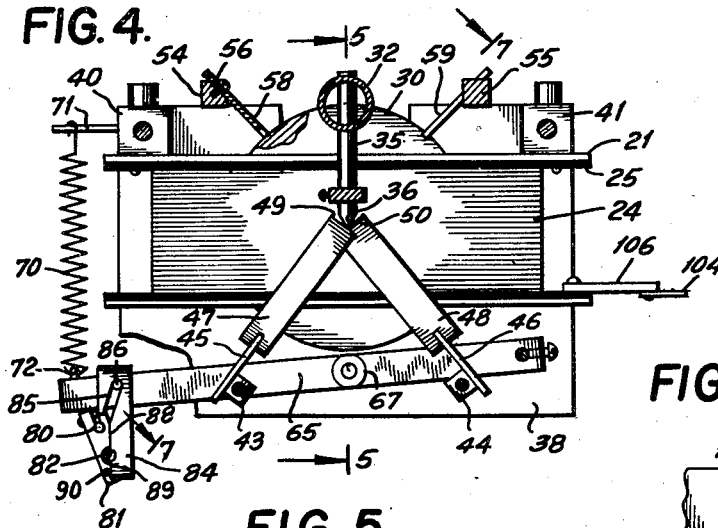
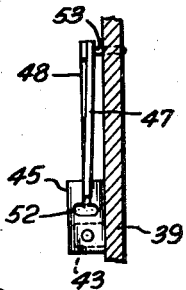
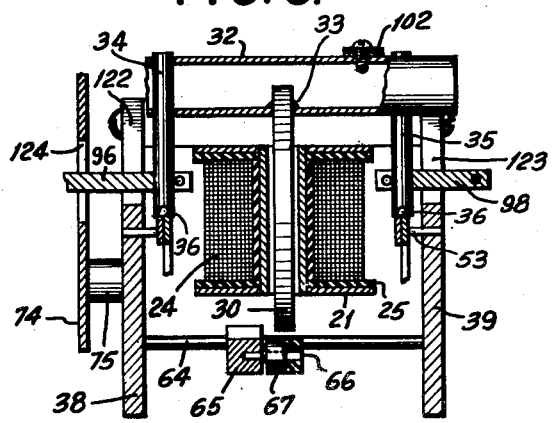
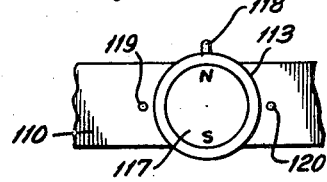
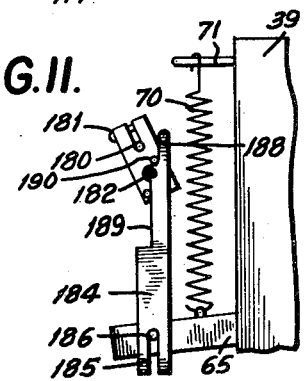
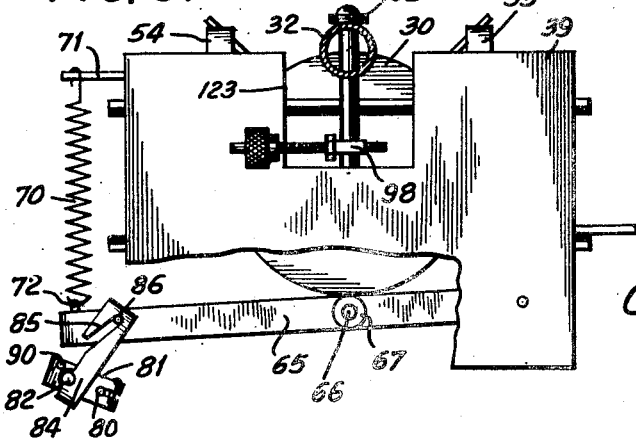
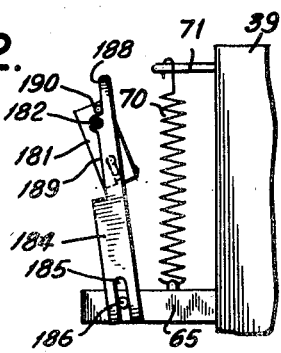
INVENTOR.
CHARLES F. WALLACE
BY
Ernest D. Given
ATTORNEY Patented Jan. 16, 1951

2,538,740

UNITED STATES PATENT OFFICE 2,538,740

GALVANOMETER

Charles F. Wallace, Westfield, N. J., assignor to Wallace & Tiernan Products, Inc., Belleville, N. J., a corporation of New Jersey Application September 11, 1946, Serial No. 696,115

11 Claims. (Cl. 171—95)

This invention relates to electrical translating devices, i. e. devices which translate or convert electrical energy into mechanical movement, and particularly devices wherein the resulting mechanical displacements, which may be generically described as indications, are a function of the supplied electrical energy. In an important specific aspect the invention relates to improvements in apparatus of the character described and claimed in my Patent No. 2,341,834, granted February 15, 1944, and entitled "Recording Galvanometer." While reference is made to the said patent for a complete description of the type of translating device therein disclosed, it may be noted that a particularly useful form of the latter comprises a stator winding having an open core and a permanent magnet rotor in the shape of a disk or the like disposed in the core for rotative displacement about an axis at an angle to the electrical axis of the winding, the rotor being conveniently mounted on an axle or its equivalent having an offset portion to which an edge of the rotor is secured.

An important object of the present invention is to provide novel and advantageous structural features and combinations thereof in electrical translating devices, for enhancing the accuracy, durability, dependability and convenience thereof. A more specific object is the provision of improved bearing means in devices of the sort described, together with associated instrumentalities adapted to avoid damage to the bearings and to avoid other derangement, as during periods of non-use. Another object is to provide a device of the character stated, which is adapted to be mounted on a panel or the like and which includes provisions, operable from the front of the panel, for effecting zero setting of the instrument and for protecting the device when not in use. Further objects are to provide improved means and combinations of instrumentalities in such devices, affording greater reliability and less likelihood of damage, improved flexibility or adjustability to different circumstances of use, and better sensitivity.

Other objects include such as are hereinafter stated, or otherwise apparent or incidental to the construction and use of instruments embodying the invention. By way of illustrative example, from which the principles of the invention may be readily understood, certain presently preferred embodiments are shown in the accompanying drawings, wherein:

Fig. 4 is a section on line 4—4 of Fig. 2, but with some parts cut away on a more central section and the rotor structure disposed in its operative position;

Fig. 5 is a somewhat fragmentary vertical section on line 5—5 of Fig. 4, with certain parts in elevation;

Fig. 6 is a rear elevation of the instrument, with a portion cut away to show the rotor structure and other instrumentalities in a position intermediate the positions of Figs. 3 and 4;

Figure 1:
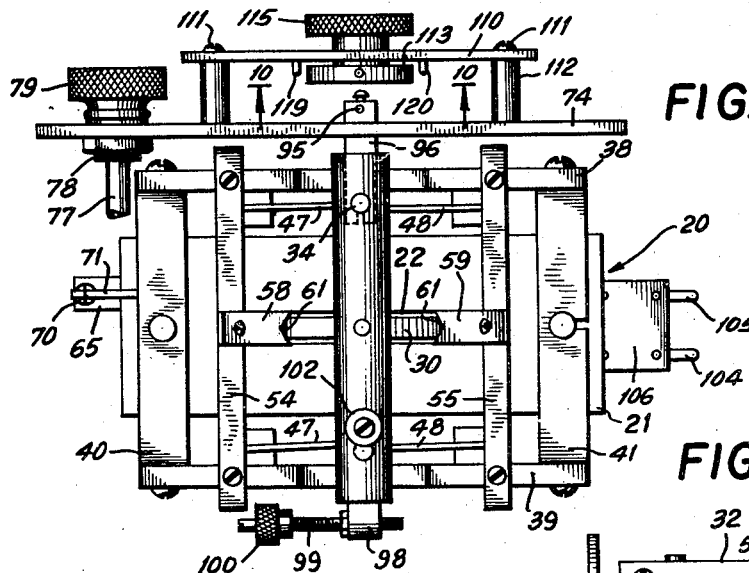
Figure 1 is a plan view of one instrument incorporating the invention, certain lower parts being omitted for clarity.
Figures 7, 8:
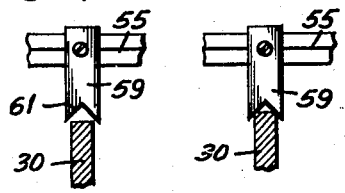
Figure 3:
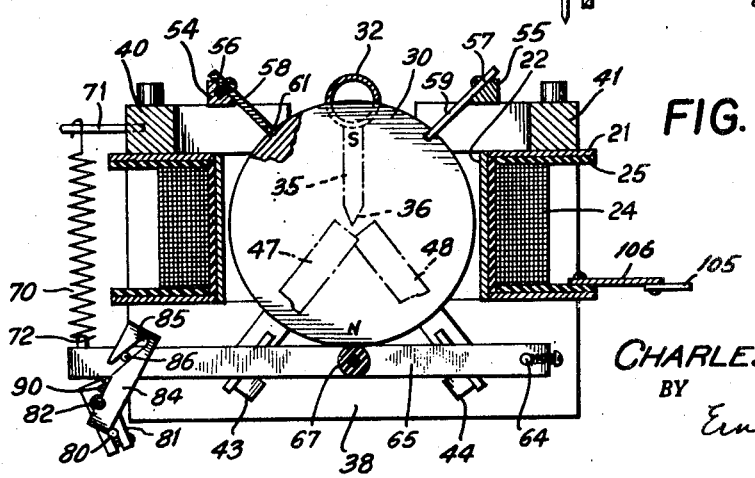
Fig. 3 is a section on line 3—3 of Fig. 2, with one portion in section on a lower plane.

Figs. 7 and 8 are fragmentary detail views, taken as if on line 7—7 of Fig. 4, showing the rotor in the positions of Figs. 4 and 3 respectively;

Fig. 9 is a fragmentary detail view of another portion, as if on line 7—7 of Fig. 4;

Fig. 10 is a fragmentary elevational view taken on line 10—10 of Fig. 1; and

Figs. 11 and 12 are fragmentary rear elevations, showing a modification of certain actuating instrumentalities, the latter appearing in positions respectively corresponding to Figs. 4 and 3.

Referring to Figs. 1 to 6, inclusive, the illustrated instrument comprises a stator generally designated 20, including a metallic spool 21 having a central opening 22 of rectangular cross section extending along a vertical axis and provided with an electrical winding 24, having such number of turns and being of such character in other respects as may be appropriate for a desired use of the instrument in accordance with known electrical principles. The winding 24 may, if desired, be insulated from the spool 21 not only by the use of insulated wire but also by the inclusion of a lining of electrical insulation 25 in the spool. Although in some instances the spool itself may be of non-conducting material, it has been found advantageous to employ a conductor, such as brass or copper, whereby eddy current or similar phenomena afford a damping effect on the rotor of the instrument, thus avoiding violent oscillation when the rotor moves to a new position in response to a change in electrical energy supplied to the winding.

The rotor or armature 30 comprises a disk of magnetic material disposed within the core opening or slot 22 of the spool 20, so that the geometric axis of the disk, about which it may rotate as hereinbelow explained, extends in a direction perpendicular to the electrical axis of the solenoid, conveniently through a central part of the latter.

The rotor 30 may constitute, for example, a single piece of a material having high magnetic retentivity, and may be permanently magnetized along a diameter so as to have poles at opposite edges of the disk. While steel or any one of several other compositions is useful for the rotor material, exceptional results have been had with the alloy known as Alnico. For purposes of illustration, the disk is shown in Fig. 3 with its poles at upper and lower edges when the associated instrumentalities connected to the disk are also positioned as shown, but the relation of the poles of the permanent magnet disk may be otherwise disposed, to suit the requirements of use. In fact under some circumstances, the position illustrated in the drawings might correspond to a point of maximum deflection over a certain range, or at least to a point of considerable deflection, i. e. in that the magnetic axis of the disk is shown as coinciding with that of the winding 24; in such case provision may be made, for example as explained below, to bias the disk so that its magnetic axis is at an angle to that of the winding when the latter is deenergized or is supplied with electrical energy below a predetermined limit.

A supporting structure for the disk, in certain respects equivalent to the axle assembly of my cited patent, includes a transverse member 32, of tubular shape and having a transverse notch into which the upper edge of the disk is seated and fastened, as by soldering, at 33. Projecting downwardly from the mounting tube 32 at opposite sides of the stator 20, i. e. outside the latter, are a pair of rods 34, 35, each provided at its lower end with a knife edge configuration 36 to be seated in a bearing support as hereinbelow described, the knife edges 36 conveniently lying in the geometric axis of the disk 30.

The instrument is mounted on a pair of spaced front and rear plates 38, 39 fastened together at their two upper corners by the spacer bars 40, 41, the plates being respectively disposed outside the paths of the rods 34, 35. As will be seen, the upper face of the spool 21 is secured to the undersides of the bars 40, 41, so that a rigid support is provided for the stator.

Although other bearing structures may be employed in some cases, the illustrated arrangement of the knife edges 36 and their associated bearing supports, presently to be described, has been found of special advantage in combining sensitivity with ruggedness, and in providing both ease and permanence of centering adjustment for the rotor assembly. Since each of the knife edges 36 is provided with a bearing support of the same construction, it will suffice to describe the instrumentalities adjacent the rear plate 39. A pair of mounting blocks 43, 44 (Figs. 2 and 4) are secured to the inner face of the plate 39 at spaced positions near its lower edge. Each block is set at an angle, or is otherwise shaped to have an obliquely disposed upper surface, lying in a plane that includes or is closely parallel to the intended axis of the rotor 30. Secured to the described oblique upper surfaces of the blocks 43, 44 are a corresponding pair of resilient strips, 45, 46, of spring metal such as phosphor bronze, beryllium copper, or the like, and each of the spring members 45, 46 carries at its upper free end a plate-like member, of somewhat stiffer construction and mounted with its faces at right angles to the faces of the corresponding one of the strips 45, 46, such members being respectively designated 47, 48 in the drawings.

Referring further to Figs. 2, 4, 5 and 9, the members 47, 48 are of elongated rectangular shape and lie substantially in a plane perpendicular to the intended rotor axis, with their square ends 49, 50 partially overlapping. Because of the oblique disposition of the plates 47, 48, preferably such that there is an acute angle, for example of 60° to 75° between their longer sides, the upper end edges 49, 50 intersect in an obtuse angle providing at its apex a bearing seat for the knife edge 36.

For the described mounting of the plates 47, 48, each of them may be slotted at its lower end to receive the upper end of the corresponding one of the spring strips 45, 46, the thus interlocked plate and strip being soldered together. For greater flexibility, each of the spring strips is provided with a central opening or cut out region 52. The plates 47, 48 may be in light contact throughout their surfaces at the region of overlap, and to keep them in position, they may be biased, by their natural resilience (in the mounted arrangement), toward the adjacent supporting plate 39 and thus against a pin 53 projecting inwardly from the latter at the region of overlap.

An identical set of blocks, spring members and angularly disposed overlapping plates, is mounted on the inner face of the front wall 38, such parts being identically numbered in the drawings and serving to provide an identical bearing support for the knife edge 36 of the front rod 34. It will now be seen that the described instrumentalities are an effective seat for the knife edges 36, to pivot the armature 30 about its intended axis. At the same time, by reason of the flexible nature of the parts, particularly the spring members 45, 46, the precise position of the intersection of the edges 49, 50 may be easily pre-adjusted, as by slightly bending the spring members, to locate the line of bearing support at any point within a considerable area. Furthermore, once adjusted for a particular position, the structure is remarkably free from permanent derangement by mechanical shock, wear or other disturbance, the reliability of the structure in these respects being enhanced by the cooperating effect of the arrangement of intersecting edges 49, 50 and of the resilient mounting, as described above.

The illustrated instrument also includes means for caging the rotor structure, as during periods of shipment or at other times of idleness, to prevent damage or misadjustment. To that end provisions are included not only for elevating the rotor structure so that the knife edges 36 are raised clear of the bearing supports, but also for engaging and holding the rotor against displacement when it is so lifted. Thus a pair of parallel supporting bars 54, 55, secured to the top edges of the plates 38, 39 and extending between them at localities spaced from the central transverse plane of the instrument, have recesses 56, 57 machined in their opposed upper edges to hold a corresponding pair of plates 58, 59 respectively extending in oblique directions toward the rotor 30. The lower end of each of the plates 58, 59 is provided with a notch 61, for example in the shape of a re-entrant right angle as shown in Figs. 7 and 8.

The plates 58, 59 are so disposed that when the knife edges 36 are seated and the rotor 30 is free to turn on its axis, the sides of the notches 61 are clear of the adjacent edges of the rotor, i. e. as in Fig. 7. The spacing is sufficiently close, however, so that when the rotor is elevated to unseat its knife edges 36, it may be held within and against the sides of the slot 61, as shown in Fig. 8. Moreover, the plates 58, 59 are preferably so proportioned that the extremities of the notch 61 always slightly overlap the sides of the rotor 30, although spaced therefrom when the latter is seated in its bearings; thus the rotor is automatically guided by the sides of the notches when it is raised into caged position, i. e. from the relation of Fig. 7 to that of Fig. 8.

A shaft 64, extending between and journaled in the plates 38, 39 near a lower corner of the latter, carries a bar or arm 65, to extend in a generally horizontal direction across the lower part of the instrument. The bar 65 has a sidewise projecting pin 66 at a central locality, the pin in turn carrying a bearing sleeve 67, which may be made of rubber or other resilient material for effectiveness of grip and minimization of shock. As shown in Figs. 3, 4 and 5, these parts are disposed so that the sleeve or stud-like member 67 is located immediately below the center of the rotor disk 30. A coil spring 70 is mounted under tension between a pin 71 extending outwardly from the frame bar 40 and a pin 72 on the outer end of the bar or rocker 65, to bias the latter strongly in an upward direction, whereby the stud 67 can engage and raise the under side of the rotor 30 and by the force of the spring, can then hold the rotor in the notches 61 of the plates 58, 59 with the knife edges 36 unseated.

The apparatus shown includes a mounting panel 74 (Figures 1, 2 and 5), to which the front plate 38 is secured by bolts and spacers 75, the panel 74 constituting the face of the instrument and serving to carry the scale, chart, or other means (not shown) upon which the translated indications are registered. The caging mechanism conveniently includes means operable from the face of the panel for selectively setting the rocker 65 either in a caged position, i. e. with the rotor elevated from its bearings and held against the notches 61, or in an uncaged position wherein the knife edges 36 are seated and the rotor is free to swing. Such mechanism comprises a shaft 77 mounted in a bearing bushing 78 in the panel (Fig. 2) and carrying on its outer end an operating knob 79. To the inner, reduced end portion 80 of the shaft 77 (Figs. 3 and 4), there is secured a short arm or block 81, thus arranged to swing with the shaft, about the axis of the latter, as the knob 79 is turned.

On the rear face of the arm 81, at a point 82 spaced from the shaft end 80, there is pivoted a link 84, which has a somewhat obliquely disposed slot 85. As shown in Figs. 3, 4 and 6, the slot opens near the center of the link and extends toward an end of the latter remote from the pivot 82. A sidewise projecting pin 86 near the end of the rocker bar 65 is disposed to travel in the slot 85. On either side of the pivot location 82 the link 84 has a flat, pin-arresting surface perpendicular to its faces. As seen for instance in Fig. 4, the upper such surface between the pivot 82 and the slot 85 is designated 88, and the lower arresting surface, in effect a continuation of the surface 88 and disposed on the other side of the pivot 82, is designated 89. Each of these surfaces is adapted to be abutted by a pin 90 that projects laterally from the outer face of the arm 81, near a corner of the latter on the other side of the pivot locality 82 from the shaft 80.

When the rotor is to be maintained in operative position with its knife edges 36 seated in the described bearing supports, the caging mechanism is disposed as seen in Fig. 4. In this position the arm 81 extends downwardly from the shaft 80 and at an angle placing the pivot 82 in a locality, so to speak, somewhat beyond center, i. e. so that the spring 70, tending to raise the bar 65 and with it the link 84, biases the arm 81 upwardly or in a counter-clockwise direction about its shaft, as seen in Fig. 4. At the same time, in this position the pin 90 is engaged with the surface 89 of the link, preventing any actual counterclockwise displacement of the arm. The parts, including the arm 65 in its lower position, are thus held in place by the spring and by the cooperating engagement of the pin with the link, and can be moved only when intended, i. e. by forcible, clockwise rotation of the shaft 77–80.

Hence if it is desired to cage the rotor, i. e. to lift it from its bearings and hold it against notches 61, the knob 79 is turned to rotate the shaft 80 from the position of Fig. 4 about 180° clockwise to that of Fig. 3. Such rotation, at first against the tension of the spring 70 and then with its aid, carries the arm 81 and link 84 through the position illustrated in Fig. 6—where the lifting stud 67 just engages the underside of the rotor 30—and finally brings the parts to rest in a relation such as shown in Fig. 3. Here the stud on the bar 65, now raised to its upper position, holds the rotor 30 against the notches 61, with the bearing edges 36 spaced above their supports. The arm 81 extends at a small angle to the vertical, with the pin 90 arrested by the upper surface 88 of the link 84. Although the arm 81 may now have been turned so that the inner end of the slot 85 is clear of the pin 86, the latter remains within the slot, and beyond some small play in the specific structure shown, the arm 81 is prevented from any unintentional counterclockwise rotation, by the bias due to the spring 70 acting through the arm 65, pin 86 and link 85. Thus in the position of Fig. 3 all parts are effectively locked, the rotor 30 being positively held by the spring 70 and the cooperating structure, against displacement in any direction.

To re-seat the rotor assembly, the knob 79 is simply turned in the reverse direction so that the shaft 80 moves counterclockwise as seen from the rear, and the parts are restored to the position of Fig. 4. By the described instrumentalities, easily operated from the front of the panel 74, the rotor assembly can be effectively caged during periods of idleness, as when the instrument is to be shipped or moved or is simply out of use; or the knob may be turned to the seated position, replacing the rotor on its pivots so that it is free to swing angularly about its intended axis. The resiliently mounted bearings cooperate to avoid shocks during seating operation and the structure is also such that the overall bias is toward the caged position, where the rotor is locked by the direct tension of the spring 70, independent of any frictional or other less positive holding arrangement.

Figure 2:
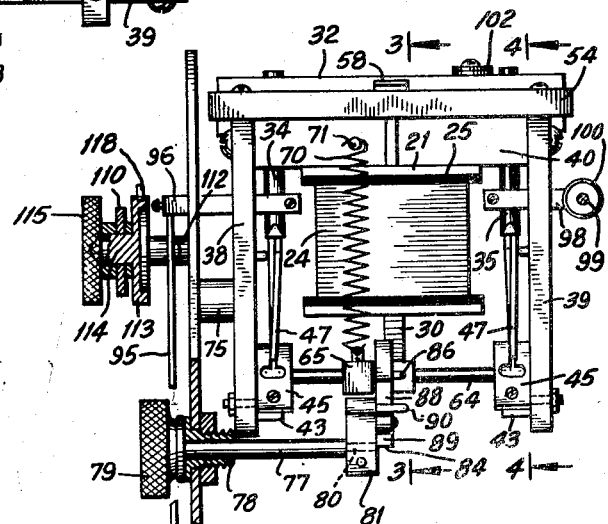
Fig. 2 is a side elevation of the device of Fig. 1, with some parts in vertical section, the rotor structure being shown in raised, protected position.

Although translating devices of the character shown may be adapted for a variety of purposes, as to operate recording pens, contacts or other indicating or controlling instrumentalities, the device is illustrated as having, by way of example, a pointer 95 carried on the end of an arm 96 which is in turn secured to the bearing rod 34 as shown in Figs. 1, 2 and 5. The depending pointer 95 thus sweeps across the face of the panel 74, which may carry an appropriate scale, not shown.

The other supporting rod 35 carries a similar arm 98 projecting beyond the rear plate 39 and transversely carrying rod 99, upon which there is threaded a weighted nut 100, the arrangement of rod and nut being adapted to provide a gravitational bias for the rotor assembly, e. g. tending to turn the latter counterclockwise from its position of Fig. 6. For similar balancing or biasing purposes, further weighted structure may be affixed to the rotor assembly as desired, for example the washers 102 secured on the top of the mounting tube 32 (Figs. 1, 2, 5 and 6). Electrical connection to the winding 24 may be effected by terminals 104, 105 carried on an insulating plate 106 secured to the spool 21 as shown, further wiring or circuit details being omitted from the drawings as not constituting a specific feature of the present invention, it being understood that whereas a single winding 24 is depicted for the sake of example, other winding and terminal arrangements may be employed, including a plurality of windings having cumulative or differential effects.

Further control means operable from the face of the panel 74 include magnetic biasing means carried on a small panel or plate 110 which is mounted in front of the panel 74 by screws 111 and spacers 112. Referring to Figs. 1, 2 and 10, the biasing means comprises a disk 113 having an integral stud shaft 114 rotatably supported in a bearing aperture in the panel 110 and carrying at its outer end a knob 115, the disk 113 thus being arranged with its axis horizontal and for rotation by the knob 115. The inner face of the disk is recessed and has fitted in it a disk-shaped permanent magnet 117 poled along an axis corresponding to a diameter of the disk. The axis of this rotatable assembly advantageously coincides with that of the rotor 30, and by virtue of the cooperating magnetic fields of the rotor and the magnet 117, the latter exerts a biasing effect on the rotor, and such effect may be adjusted angularly, about the rotor axis, by turning the knob 115. To limit its movement if desired, the disk 113 may have a projecting pin 118 adapted to abut stop pins 119, 120 on the panel 110.

Although one specific disposition of the magnetic poles of the member 117 and of the rotor 30 relative to each other and to cooperating instrumentalities is shown in the drawings, the poling of these elements may be otherwise arranged, to suit the requirement of any given instrument or use. Thus the magnetic biasing device may bear any desired predetermined relation to the gravitational biasing means 99—100, e. g. either to augment or oppose each other. A particularly important function of the magnetic biasing means is by way of independent adjustment for setting the zero point of the instrument. That is to say, such adjustment is not only useful where the instrument is simply employed as an ammeter, voltmeter, or the like, but is of particular utility where the ultimate reading or other response is in terms of some other quantity.

Thus, for example, if the instrument is to be used for indication or control operation in accordance with chemical composition of a flowing material, such composition being detected by an appropriate cell and converted into changes of current which are in turn translated by the illustrated device, the end control point of the scale may depend upon conditions other than absolute current flow, i. e. in that in one situation such point may be represented by one current while under other circumstances a different value of current must be selected. The illustrated arrangement is well adapted for such use, having a relatively wide range of adjustment of the biased position.

The mounting plates 38, 39 are appropriately cut away at 122, 123, to accommodate projecting portions of the rotor assembly, especially the arms 96 and 98 by which motion is transmitted to localities outside the plates. Similarly, the panel 74 may have an aperture 124 of considerable size for passage of the member 96, permitting full displacement of the latter throughout the range desired.

Figs. 11 and 12 illustrate a somewhat modified form of instrumentality for operating the caging mechanism. In these figures, wherein the rear plate 39, spring 70, and bar 65, may be the same as in the preceding figures, there is provided an arm 181 secured on the end portion 180 of an operating shaft (not shown) that may be identical with the shaft 77 of Figs. 1 and 2 and similarly actuated by a knob on the face of the instrument panel. Pivoted to the arm 181 at 182 is an elongated member 184 corresponding to the link 84 but having a slot 185 opening from an extremity remote from the pivot 182 and disposed to exert force downwardly on the rocker bar 65 by pushing on a pin 186 on the latter. The portions of the member 184 adjacent the pivot 182 include stop surfaces 188 and 189 for selective abutment by a pin 190 on the member 181, these parts being generally similar in structure and effect to the correspondingly numbered elements in Figs. 3, 4 and 6.

It will be seen that in Fig. 11, which corresponds with Fig. 4 and wherein the rocker arm 65 is in its lower position, permitting the rotor bearings to be seated, the member 184 exerts downward force on the pin 186, against the spring 70, which in turn would tend to raise the member 184 and rotate the arm 181 counterclockwise but for the engagement of the pin 190 with the surface 189. To cage the instrument, i. e. to lift the rotor from its bearings and hold it against the members 58, 59 (see Figs. 3 and 4), the shaft 180 is rotated clockwise as seen in Figs. 11 and 12, until the pin 190 abuts the surface 188. In such position, Fig. 12, the rotor is caged as in Fig. 3, it being noted that the parts 181 and 184 occupy positions substantially corresponding with those shown in Fig. 3.

Translating devices of the character described are rugged and reliable in operation, but amply sensitive for a variety of delicate measurements or responses. When set up for use in a given control or measuring system, the winding 24 is connected in the desired circuit, and when the equipment is ready for operation, the knob 79 is turned to release the rotor 30 and seat its knife edges 36 in the bearing supports. The knob 115 may then be adjusted to locate the appropriate minimum or zero position of the pointer 95, and desired readings or recordings may be taken. For safety during periods of idleness or if the apparatus is to be moved, the rotor can be re-caged simply by manipulating the knob 79. Thus control of the instrument, both as to caging and biasing, is readily accomplished from the front of the panel, the control means being compact and arranged so as not to interfere with the movements of the rotor or of the pointer or other device actuated by the rotor. The biasing adjustment is peculiarly advantageous, in that it gives the operator the sense that he is actually displacing the pointer 95 when the knob 115 is turned—yet there is no direct mechanical connection between these parts.

As will now be appreciated by those familiar with electrical instruments, and depending on the nature of the winding or windings 24 and of any series or shunt resistor or other accessory used, the device may be employed, for example, to measure current or voltage, or as a simple galvanometer, or for other specialized electrical response. Likewise the mechanical movement into which electrical energy is translated may serve any of a variety of purposes, e. g. to actuate a pointer or recording pen or the like, or to effect operation of contacts or other control instrumentalities.

It is to be understood that the invention is not limited to the specific structures herein shown by way of example, but may be embodied in other forms without departure from its spirit.

I claim:

1. In an electrical translating device, in combination, a stator having associated supporting structure, a rotor, separable bearing means for the rotor, said bearing means including means carried by the rotor and having a knife edge, and a pair of members resiliently mounted to the supporting structure and having intersecting edges to form a notch for receiving said knife edge, and means for shifting the rotor to separate said bearing means whereby said knife edge is lifted from said notch, said shifting means including spring means for biasing the rotor to shifted position.

2. In an electrical translating device, in combination, a stator, rotor structure including a disk-shaped member, separable bearing parts for mounting said structure for rotation about the geometric axis of said disk-shaped member, retaining means spaced from one edge of said member and adapted to engage said edge upon displacement of the member toward said retaining means, and means disposed adjacent an opposite edge of said member and shiftable from a position spaced from said edge, to engage the edge and move the member into engagement with the retaining means, and thereby to separate said bearing parts.

3. In an electrical translating device, in combination, a stator, rotor structure including a disk-shaped member, separable bearing parts for mounting said structure for rotation about the geometric axis of said disk-shaped member, retaining means spaced from one edge of said member and adapted to engage said edge upon displacement of the member toward said retaining means, means disposed adjacent an opposite edge of said member and shiftable from a position spaced from said edge, to engage the edge and move the member into a position of engagement with the retaining means, and thereby for separating said bearing parts, a spring continuously biasing said shiftable means toward the second mentioned position, and control means adapted to hold the shiftable means against the spring, and displaceable to effect movement of the shiftable means by the biasing force of the spring on the latter, for selectively disposing the latter in either of said positions.

4. In an electrical translating device, in combination, a stator, rotor structure including a disk-shaped member mounted for rotation within the stator about a horizontal axis intersecting said stator, a pair of retaining members disposed above the rotor at positions angularly spaced along the periphery of the latter and spaced from the rotor when the latter is disposed for rotation about its axis, a rocker arm below the rotor adapted to engage the underside thereof, a spring biasing the rocker arm to engage the rotor and lift the latter against the retaining members, linkage connected with said rocker arm and including a rotatable actuating arm, for swinging said rocker arm between a position wherein the rocker arm holds the rotor against the retaining members, and a position wherein the rotor is released by said arm and members, said linkage being biased by said spring against displacement from either of said positions, and control means for turning said rotatable arm.

5. In an electrical translating device, in combination, a stator comprising a winding having a vertical axis, a rotor of magnetic material disposed within said winding, bearing supports outside of said stator, means eccentrically secured to the rotor and including bearing members removably seated in said supports, for mounting the rotor on a horizontal axis transverse of the axis of the winding, retaining means disposed above the rotor and engageable by the latter upon displacement of the same upward, and means adapted to abut said rotor and shiftable to raise the latter and its bearing members from the bearing supports, for holding the rotor against the retaining means.

6. In an electrical translating device, in combination, a stator having associated supporting structure, a rotor and separable bearing means for the rotor, said bearing means including means carried by the rotor and having a knife edge, and a pair of members separately resiliently mounted to the supporting structure and overlapping in a plane which intersects said knife edge, each of said members having an edge which intersects the corresponding edge of the other member, said intersecting edges forming a notch for receiving said knife edge.

7. In an electrical translating device, in combination, a stator having associated supporting structure, a rotor and separable bearing means for pivoting the rotor on a predetermined axis, said bearing means including means carried by the rotor and having a knife edge, a pair of plate-like members overlapping in a plane perpendicular to said axis and having intersecting end edges forming a notch with its apex at said axis to receive the knife edge, each of said members having a resilient mounting strip secured to an end thereof opposite to its aforesaid intersecting end edge, and means securing the mounting strips to the supporting structure.

8. In an electrical translating device, in combination, a stator comprising a winding having a vertical axis, a permanent magnet rotor disposed within said winding, supporting structure eccentrically secured to said rotor for pivotally mounting the latter to rock about a horizontal axis intersecting the winding axis centrally of the latter, said supporting structure including a bearing member having a knife edge in said horizontal axis, and means to support said knife edge, comprising a pair of plates disposed in a plane at an angle to said horizontal axis and having overlapping ends forming a V-shaped support, and a pair of spring strips respectively supporting said plates, adapted to bend resiliently and to be adjusted angularly about respective axes parallel to but spaced from the rotor axis and each other.

9. In an electrical translating device, in combination, a stator having associated supporting structure, a permanent magnet rotor disposed to be rotated within the stator about a predetermined axis, axle means for mounting the rotor for said rotation, said axle means having an eccentric portion secured to an edge of the rotor, and said axle means having extended portions terminating in a knife edge at said axis on opposite sides of the exterior of said stator, and a bearing support at each of said sides of the stator, for the corresponding knife edge, each bearing support comprising a pair of members resiliently mounted to the supporting structure and having intersecting edges to form a notch for receiving the corresponding knife edge.

10. In an electrical translating device, in combination, a stator having associated supporting structure, a permanent magnet rotor, bearing means carried by the rotor, cooperating bearing means separably engaging the first-mentioned bearing means and carried by the supporting structure, one of said bearing means having resilient mounting means therefor and both said bearing means cooperating to pivot the rotor on an axis at an angle to its magnetic axis, a control panel secured to the supporting structure in a position intersecting the axis of rotation of the rotor, means including an operating member on the face of said panel and means to shift the rotor in a direction at an angle to its axis of rotation, for selectively disposing the rotor in an operative position with said bearing means engaged or in a displaced position with said bearing means separated, and means including a permanent magnet mounted on the face of said panel for rotation about the axis of the rotor, for adjustably biasing the rotor to a predeterminable angular position when it is in its aforesaid operative position.

11. In an electrical translating device, in combination, a stator, a permanent magnet rotor disposed within said stator, means eccentrically secured to the rotor and having bearings outside the stator, for mounting the rotor on an axis intersecting the stator at a central locality of the latter, a panel mounted on one side of said stator and said bearings and in a plane transverse of the rotor axis, an arm carried by said rotor-mounting means and extending through an opening in said panel, said arm carrying an indicator member to be swung across the face of the panel by movement of the armature, and means including a permanent magnet and means mounting the same for rotation about the axis of the rotor in a plane outside the face of the panel and spaced therefrom to clear the aforesaid arm and indicator member, for adjustably biasing the rotor to a predeterminable position.

CHARLES F. WALLACE.

REFERENCES CITED

The following references are of record in the file of this patent:

UNITED STATES PATENTS

| Number | Name | Date |
|---|---|---|
| 336,688 | Barrett | Feb. 23, 1886 |
| 1,043,478 | Stephenson | Nov. 5, 1912 |
| 1,709,571 | Harrison | Apr. 16, 1929 |
| 2,171,755 | Langsner | Sept. 5, 1939 |